Nov. 30, 1965    R. W. POWELL ETAL    3,220,298
THEODOLITE FOR MEASURING AZIMUTH AND ELEVATION
ANGLES OF TARGET OBJECT
Filed Feb. 29, 1960    2 Sheets-Sheet 2

INVENTORS
RICHARD W. POWELL
BY   CLYDE W. HARRIS

ATTORNEY

United States Patent Office 3,220,298
Patented Nov. 30, 1965

3,220,298
THEODOLITE FOR MEASURING AZIMUTH AND ELEVATION ANGLES OF TARGET OBJECT
Richard W. Powell, West Covina, and Clyde W. Harris, Santa Barbara, Calif., assignors to Aerojet-General Corporation, Azusa, Calif., a corporation of Ohio
Filed Feb. 29, 1960, Ser. No. 11,921
9 Claims. (Cl. 88—1)

This invention relates to theodolite devices which intercept rays from a target object and thereby measure the azimuth and elevation angles of the target object with respect to the bore-sighted direction of such a theodolite device.

The object of this invention is to provide a theodolite device which presents, almost instantaneously, its output data in convenient digitalized electrical pulse form.

Phototheodolite pictures, which have been produced by theodolites heretofore employed to measure azimuth and elevation angles of a target object with respect to the theodolite's bore-sighted direction, have generally required long and laborious processing before their intrinsic data is placed into a conveniently usable final form. Target objects which move at a substantial speed are sometimes the objects about which azimuth and elevation angle information is desired, as for example, long range rockets. For such fast-moving objects, it is desirable to have theodolite data which is readily and conveniently usable so that the data's immediate value is not lost by any delay in changing its form to a convenient usable form.

The invention is carried out by providing a theodolite device in which rays from a target object are intercepted by an electrical detector sensitive to the intercepted rays. A pattern of alternating opaque and open areas on a moving reticle means provided between the target object and the detector causes the detector pulse output to have a distinctive time period which is dependent on the angle of elevation of the target object; and a second pattern, arranged on the reticle means in fixed relationship to the first pattern, controls an electric gate circuit so that the period of time which the detector's pulse output is allowed through the gate circuit is a distinctive time period which is dependent on the azimuth angle of the target object. The full pulse having a distinctive time period and a part of the same pulse having another distinctive time period as it passes through the gate circuit are separately registered in digitalized electrical pulse form for use in digital calculator processing.

A feature of this invention resides in the gate circuit which is controlled by the moving reticle and which determines the part of the pulse output representative of the azimuth angle of the target object.

The foregoing and other features of our invention will be better understood from the following detailed description and accompanying drawings of which:

Figure 1:
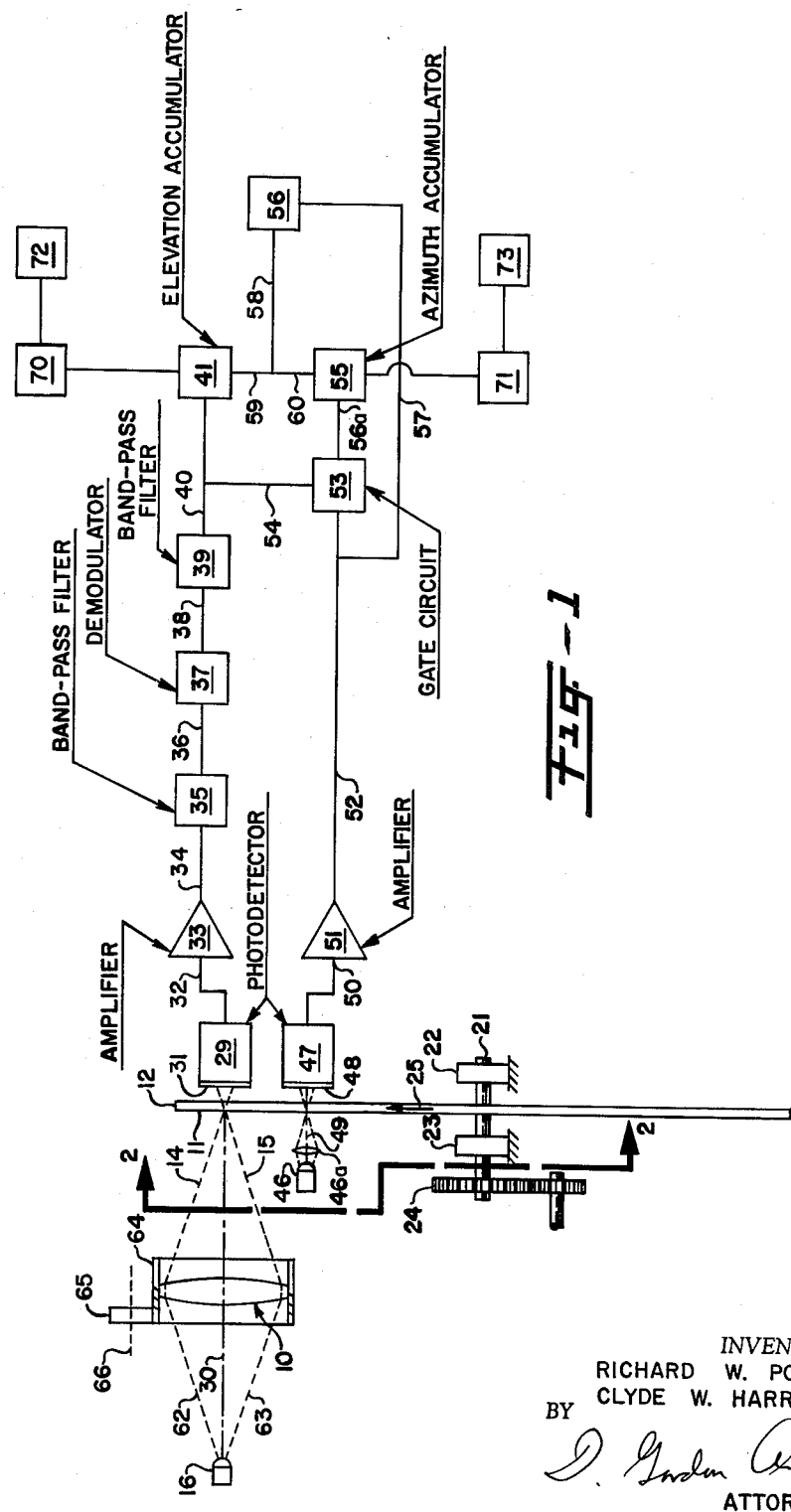
FIG. 1 shows a theodolite device partly in cut-away section in a side view of its reticle and having its electric circuit elements represented by a schematic block diagram.

In FIG. 1 there is shown a theodolite device having a suitable convergent optical system represented by a lens 10. A photo detector cell 29 of any suitable and convenient type responsive to the visible or other radiant energy to be received, for example, a photomultiplier, is provided. The optical system 10 images a portion of object space onto a reticle 12 which transmits energy to a photosensitive surface 31 of the photodetector cell 29 which faces the optical system 10. Such an image of object space covers the area within the limits 17 of an imaged field shown in dotted lines in FIG. 2, and also shown in FIG. 3 greatly magnified.

Figure 2:
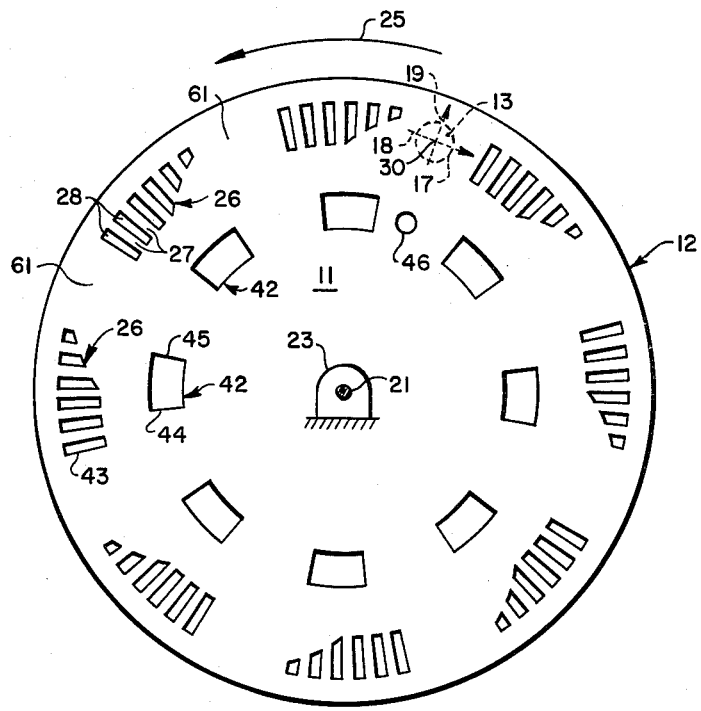
FIG. 2 is a front view of the reticle taken at line 2—2 of FIG. 1.
Figure 3:
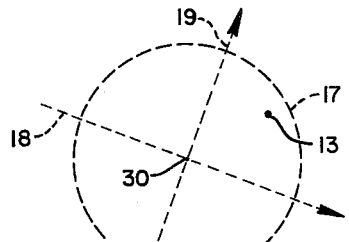
FIG. 3 is an enlarged view of the imaged field area shown in FIG. 2.

The area within the limits 17 of the imaged field area falls on the photosensitive surface 31 of the photodetector cell 29. A target 16, represented by a light source in FIG. 1, gives off rays represented by the dotted lines 62 and 63, which may for example be visible rays or even infrared rays if a lens system 10 and detector cell 29 are properly chosen for proper convergence and transmission and sensitivity for such rays. A bright point in the imaged field 17, represented by a dot 13 in FIG. 2 and FIG. 3, is caused by convergent rays received from the target 16 through the optical system 10, which rays are represented by dotted lines 14 and 15 in FIG. 1. The bright point 13 may appear anywhere within the limits 17 of the imaged field. The boundary limits 17 of the imaged field are established by the width of the solid angle for which the optical system 10 and photosensitive surface 31 is designed. For example, the imaged field may be made as large as possible by choice of a widest angle lens available and a sufficiently large detector photosensitive surface to cover the image field of such a wide angle lens. The optical system 10 is conveniently mounted in a barrel 64, shown partly cut away, and the barrel has an imaginary axis coincident with the optical axis 30 of the optical system. A boresight 65 is attached in fixed relationship to the optical system 10. The boresight 65 has a boresighted direction represented by the dotted line 66 which is parallel to the optical axis 30; and the boresight direction is the direction in which the theodolite device happens to be aimed by an operator. The dot 30 in FIGS. 2 and 3 represents the position of the optical axis line 30 in FIG. 1.

The rotatable reticle 12 is positioned to pass between the optical system 10 and the photocell detector 29 and is located in the image plane. The reticle 12 is mounted on an axle 21 so that its surface 11 facing the optical system 10 is substantially at a right angle to the boresighted direction 66. Rotation of the reticle 12 about the axle 21 may be obtained in any suitable manner. In FIG. 1, for example, the axle 21 is mounted in a pair of fixed journals 22 and 23 and a gear 24 is provided on the axle 21 which may be driven by a motor. Any suitable motor will do, since the speed of rotation of the reticle 12 is not critical, and therefore no particular motor is shown. When the circular disc reticle 12 is rotated, its surface 11 rotates in a single plane. The arrow 25 on the reticle 12 in FIGS. 1 and 2 indicates the direction of its rotation, although it should be understood that the rotation of the reticle 12 may be in either direction if the electronics system associated with it is designed to accommodate such movement.

The reticle 12, which essentially comprises a rotatable plane circular disc, is provided with a plurality of equally spaced scanning windows 26 which are concentrically located with respect to its axle 21. The scanning windows 26 comprise patterned areas having a grid of radial opaque areas 27 which alternate with transparent areas 28 of the scanning windows 26. It is to be understood that although only six transparent areas 28 and five intervening opaque areas 27 are shown for each scanning window 26, for purposes of illustration, that actually each scanning window grid 26 will ordinarily have many more such areas, for example several hundred transparent areas 28 separated by opaque areas 27.

Also disposed on the reticle 12 are a plurality of apertures 42 which are concentric about the axle 21, the apertures 42 being also uniformly spaced angularly from one another. Each of the apertures 42 is disposed in a similar fixed relationship to one of the scanning windows 26, the number of scanning windows 26 and apertures 42 being equal. Each aperture 42 is located at a time lagging position with respect to its respective scanning window 26, as shown by the direction of the arrow 25. A leading edge 43 of each one of the scanning windows 26 reaches a particular position of rotation sooner than a leading edge 44 of the corresponding one of the apertures 42.

The arrangement of FIG. 1 is provided with an electrical system responsive to the optical image. In the electrical system portion of FIG. 1, all electric elements are represented in block diagram form with suitable interconnecting leads all shown in single line form.

Output of the photodetector cell 29 goes through electrical lead wires 32, represented in single line form, to a suitable amplifier 33, represented as a block diagram. From the amplifier 33, the output is led through lead wires 34, then through a suitable band-pass filter 35, then through lead wires 36, through a demodulator 37 and lead wires 38 and another suitable band-pass filter 39. The first band-pass filter 35 accepts only those amplifier signals resulting from light source 16 as the rays are modulated by the pattern of the scanning windows 26 through which the rays pass. The signal may be demodulated in the demodulator 37 to separate the original frequency of the light source 16 intercepted at the photocell detector 29 from any modulation frequencies at the light source 16. The signal is further filtered in the second band-pass filter 39 which discriminates against all pulses from the amplifier 33 except those which originate because of the reticle chopping accomplished by the opaque and transparent areas 27, 28 of the plurality of spaced scanning windows 26.

The pulses from the second band pass filter 39 are then fed through leads 40 into a suitable pulse accumulator 41, such as a binary chain digital counter, which is a well-known device and which acts to count and hold the pulse count for readout of elevation position. The binary chain digital counter counts the pulses as they enter by allowing the pulses to trigger an input bistable circuit into the opposite stable state from that at which it was previously resting. This circuit contains the least significant bit of the binary number representing the azimuth angle or elevation angle of the target object image 13 with respect to the optical line of sight. The next bistable circuit in the chain is triggered to change stable states by the return to zero of the previous stage of the counter. In this manner, a counter of as many unique binary (high or low) states voltage as necessary (enough to represent the maximum count from the reticle 12) can be constructed, the least significant bit-circuit being triggered by the pulse count transmitted from the second band-pass filter 39 and each succeeding stage in the chain being triggered by the return to zero state of the previous stage. Counters of this type are shown on pages 421 through 425 in the publication "Analog-Digital Conversion Techniques" by Alfred K. Susskind, published jointly by the Technology Press of the Massachusetts Institute of Technology and John Wiley & Sons, Inc., 1957, and also described on pages 325 through 326 in the publication entitled "Pulse and Digital Circuits" by Jacob Millman and Herbert Taub, published by McGraw-Hill Book Co., 1956.

A steady light source 46, for example an electric light bulb, is provided on the side of the reticle 12 having the surface 11 and a suitable lens or lens system 46a focuses this light to a fine point on the reticle 12. When light from a target object 16 starts to shine through a scanning window 26, as the reticle 12 is rotated, the steady light source 46 will, at a somewhat later time, start to pass through one of the apertures 42. This can be done, for example, by arranging the light source 46 along the same radial line of the rotating reticle 12 as the image of the target object 16 is focused on. Since the leading edge of each of the apertures 42 lies on a radius of the reticle 12 which lags behind the radius on which the leading edge of the corresponding scanning window 26 lies, with reference to the direction of rotation, it will be apparent that light from the source 46 will start to pass through an aperture 42 sometime after light from the target object 16 starts to impinge on the corresponding scanning window 26. On the side of the reticle 12 opposite to the side 11 having the steady light source 46, a suitable photodetector cell 47 is located where it will receive light from the steady light source 46 on its photosensitive surface 48. Preferably an imaginary line of sight, represented by the dotted line 49, between the photodetector cell 47 and the steady light source 46, is substantially parallel to the optical axis 30 of the optical system 10.

A pair of leads represented in single line form at 50 connect the photodetector cell 47 to a suitable amplifier 51. Line 52 connects the amplifier output to a suitable gate circuit 53 which is represented in FIG. 1 in block diagram form. The gate circuit 53 is connected by a line 54 to the output line 40 from the filter 39.

The gate circuit 53 may be of any of the familiar "and" circuits as shown on page 397 through 400 in the above-mentioned publication by Millman and Taub entitled "Pulse and Digital Circuits," or any similar device. Such a device will not allow the pulses from the band-pass filter 39 to reach the azimuth accumulator 55 unless the output from the amplifier 51 is in a state corresponding to the "1" state. The "1" state is here defined as that voltage corresponding to the amplified output of the photocell 47 when the opaque portion of the reticle 12 is between the light source 46 and the photocell 47.

The azimuth accumulator 55 which may be identical with the accumulator 41 is connected to the output of gate circuit 53 by a line 56a. The accumulator 55 is supplied with a portion of the same pulses which feed the elevation accumulator 41. However, the output signal from the photodetector cell 47 actuates the gate circuit 53 to cut off the pulse train from the photodetector cell 29 to the accumulator 55 when an aperture such as 42 comes into such position as to transmit light from the light source 46. The resultant pulse train length from the photodetector cell 29 gated so as to be blocked by the gate circuit 53 which is controlled by the photodetector cell 47 is a measure of the azimuth position of the target light source 16. This results because of the fixed azimuth directional positional relationship between each elevation scanning window 26 and its respective aperture 42. For this reason, the accumulator 55 which is similar to the accumulator 41 and which acts to count and hold the pulse count for readout of target azimuth position, is referred to as the azimuth accumulator.

The intersecting dotted arrows 18 and 19 respectively, in both FIGS. 2 and 3, represent the mutually perpendicular directions, through the center of the limits 17 of the imaged field, in which azimuth and elevation respectively must be measured. These imaginary arrows 18 and 19 are also perpendicular to the direction of the optical axis 30 of the theodolite, as well as being mutually perpendicular to each other.

It is usually desirable to make the reticle 12 fifty percent transmitting in a random pattern at the regions 61, between the patterned scanning windows 26, rather than solid opaque. This partial transparency will largely eliminate jumping or sudden change of the light level in the image, representative of the background light in the image of this device, which might otherwise be present due to bright clouds or high contrast backgrounds for example.

To operate the theodolite device of this invention, operating power is first supplied to the steady light source 46 and to the electric circuit elements requiring additional power such as the amplifiers 33 and 51 and the accumulators 41 and 55. A motor is then engaged to rotate the reticle 12 by means of the gear 24. The entire device is then aimed in the general direction of the target so that the target (represented by the light source 16) is imaged, for example at 13, somewhere within the imaged field 17 on the photocell detector 29. The imaged light 13 then has some position in the imaged field with respect to the boresight direction 66 which is also the direction of the axis 30 of the optical system 10. It is this relative position of the target 16 with respect to the boresighted direction 66 which is conveniently represented by pulse counts held by the elevation accumulator 41 and the azimuth accumulator 55 in their magnetic memory drums, such as are commonly found in electronic calculators. Any pulse counting circuit which produces a unique series of binary voltage levels in proportion to the number of pulses received during a counting cycle may be used in the accumulators 41, 55. Each of the accumulators 41, 55 may also be provided with voltage indicating devices which give an indication of the binary number contained in the accumulators 41, 55. This binary number is proportional to the azimuth or elevation angle, as the case may be, of an imaged target object with respect to the boresight direction 66. Such voltage indicating devices may be a series of simple neon glow tubes connected as described in "Pulse and Digital Circuits" by Millman and Taub, page 327.

If a visual indication of the azimuth and elevation angles in degrees and seconds is desired instead of straight binary numbers, and if the computing device to which the accumulators 41 and 55 are furnishing data will accept binary coded decimal information, then the accumulators 41 and 55 may be made up of counters which operate in the binary coded decimal code. These would then contain a series of the well known "decimal counters" or "decade counters" such as shown on pages 4–22 through 4–25 in the publication by Alfred K. Susskind entitled "Analog-Digital Conversion Techniques." These counters simply reset after a count of 9 and a pulse count is passed on to the counter of the next higher power of 10 upon the reset. A logical selection circuit could then be used to light the proper decimal coded light for each of the states of each decade counter unit in the accumulator, or to bias the correct grid of a direct reading "Nixie" tube, type readout. A diode matrix such as shown on page 4–31 of the above-mentioned publication by Susskind can readily be adapted for such a logical function. Blocks 70 and 71 of FIGURE 1 are the logical selection circuits for azimuth and elevation readouts and blocks 72 and 73 are the readout circuits themselves.

In FIG. 3, for example, a target object's image which is just within the image field limits 17 and near the head of the arrow 19 representative of elevation direction, would produce a set of six pulses for each scanning window 26 as light was transmitted to the photocell detector 29 through the six transparent areas 28 of each scanning window 26 shown in the drawings (assuming only six transparent areas 28 in the scanning window 26). In much the same manner, a target object imaged just within the image field limits 17 and near the tail of the arrow 19 would produce a set of three pulses for each scanning window 26 since for such a position of the image, the photocell detector 29 would not be activated through the three transparent areas 28 having the shorter lengths. It is apparent therefore, that the total number of light transmission pulses through such a scanning window 26 is representative of elevation of a target. The total number of pulses in a set of pulses are registered on the elevation accumulator 41.

If the target object's image were just within the image field limits 17 and near the head of the arrow 18, representative of azimuth direction, such an image would produce two pulses for each scanning window 26 as light was transmitted to the photocell detector 29 before the steady light source 46 operated on an aperture 42 to cause gate circuit 53 to cut off such a generated pulse train to the azimuth accumulator 55. If the target object's image were just within the image field limits 17 and near the tail of the arrow 18 representative of azimuth direction, such an image for the particular example of the drawing would produce only one pulse for each scanning window 26 as light was transmitted to the photocell detector 29 before the steady light source 46 operated on an aperture 42, to cut off such a generated pulse train to the azimuth accumulator 55. It should, therefore, be evident that the number of pulses transmitted through a scanning window 26 before the beginning time of a blanking or cut-off pulse generated in conjunction with an aperture 42 for each scanning window 26, is a measure of the azimuth disposition of a target.

The trailing edge 45 of each aperture 42 provides a suitable voltage pulse via detector 47, which is transmitted to a reset device 56, which has the effect of resetting to zero the azimuth and elevation angle accumulators 41 and 55, respectively at the end of a frame. This circuit 56 could also be used to control the reading of the contents of the accumulators 41, 55 into a digital computer or other arithmetic device for addition or subtraction from the azimuth and elevation angles of the optical axis 30 of the theodolite.

The theodolite device may be made to distinguish a greater number of distinct steps of elevation measurements and azimuth measurements by providing a grid at the scanning windows 26 having many more than the six transparent areas 28 and the five opaque areas 27 shown in the representative FIG. 2 drawing.

It should be noted that a greater number of obvious variations of this device are possible, some of which have to do with the target and some of which have to do with pulse generation which in the particular illustrated embodiment is provided by a grid pattern across the scanning window 26. For example, any suitable target will do, and if it is not a bright target, it may be modulated as to frequency, to make it more distinctive and easier to detect. Also any pulse generation suitable for counting may be provided, for example, by a separate continuous spoke grid about the rim of the disc reticle 12 (and a separate photo-detector cell sensor), or electronically by a sequential pulse generator such as are well known in the art. In either of such arrangements, the scanning windows 26 and apertures 42, shown in FIG. 2 may be used to operate gate circuits.

Advantages of this theodolite are that virtually instantaneous data output is obtained which, furthermore, is already digitalized for further processing. The theodolite device may be used equally well by day or by night. The speed of the moving reticle 12 used to provide the pulse effect is not critical, and therefore this theodolite device is simple to operate and maintain in this respect. This theodolite device is as accurate as its reticle 12, and therefore the optimum in accuracy may be obtained primarily by using care in the manufacture of the reticle 12, rather than having the accuracy dependent upon the aggregate accuracies of a number of coordinating parts as is known in prior art devices.

It will be understood that modifications within the scope of the invention may be made from the arrangement shown in the drawings, without departing from the scope of the invention. For example, the reticle means may consist of two reticles instead of the single reticle shown, in which case the light source 46 may be associated with one of the reticles which may be provided with apertures 42 while the lens system 10 is associated with the other reticle which will be provided with the windows 26. By suitably connecting or relating the axes of rotation of the two reticles, they may be maintained with the desired space relationship between the apertures 42 and the windows 26.

Alternatively, it is not essential that the apertures 42 be located behind the corresponding windows 26 with reference to the direction of rotation as shown in FIG. 2. These apertures 42 may be placed in any angular position with reference to their corresponding windows 26, provided the light source 46 is positioned so that light from it will start to pass through an aperture 42 at the desired time interval after light from the object 16 starts to pass through the corresponding window 26.

It is desired that the invention shall not be limited except in accordance with the scope of the appended claims.

What is claimed is:

1. A theodolite for measuring the azimuth angle of an object relative to a sighting axis, said theodolite comprising: a rotatable reticle means having an axis of rotation substantially parallel to the sighting axis, a light-sensitive detector disposed on one side of said reticle means in alignment therewith and responsive to light passing through said reticle means for emitting an output signal, an optical system disposed on the opposite side of said reticle means in alignment with said reticle means and said detector for directing light rays from the object to said reticle means so that light passes through said reticle means to said detector, said reticle means having a plurality of window means disposed radially outwardly from the axis of rotation of said reticle means in circumferentially spaced relationship, each of said window means comprising a plurality of light-transmitting areas alternating with opaque areas, whereby each penetration of a light-transmitting area by light rays directed against said rotating reticle means by said optical system produces a pulse in said detector as an output signal emitted therefrom, said reticle means being provided with a second window means, a light source disposed on one side of said reticle means for impinging light on said second window means at intermittent intervals when said reticle means is rotating, a second light-sensitive detector disposed on the opposite side of said reticle means from said light source and in alignment therewith for emitting an output signal in response to light passing through said second window means in said reticle means, transmission control means operably connected between the respective output sides of said first-mentioned detector and said second detector for regulating the reception of output signal pulses from said first-mentioned detector to be received through said transmission control means dependent upon output signal pulses being emitted by said second detector when light passes through said second window means in said reticle means, whereby the transmission of output signal pulses from said first-mentioned detector through said transmission control means is discontinued when light passes through said second window means, and the number of output signal pulses transmitted through said transmission control means before discontinuance of the transmission thereof is a function of the azimuth angle of the object being viewed relative to the sighting axis.

2. A theodolite according to claim 1, further including a resettable accumulator operably associated with said first-mentioned detector for receiving the output signal pulses emitted by said first-mentioned detector, said transmission control means including a gate circuit operably interposed between the output side of said first-mentioned detector and said accumulator and being disposable in a transmitting or a non-transmitting condition to control the reception of output signal pulses emitted from said first-mentioned detector by said accumulator, and said accumulator having indicating means giving an indication of the number of pulses which it receives from said first-mentioned detector after being reset.

3. A theodolite having a boresight for measuring elevation and azimuth angles of a target with respect to the boresight, said theodolite comprising: a reticle rotatable about an axis and having partly transparent scanning window means, said scanning window means comprising spaced opaque areas disposed radially outwardly from the axis of rotation of said reticle and radially extending transparent areas alternating with said opaque areas, at least some of the radially extending transparent areas being of successively decreasing radial length in the direction of rotation of said reticle; a light-sensitive detector means having electric current pulse output when activated by light, said detector means being disposed on the side of said reticle opposite to the side on which said target is disposed and being activated by light from the target passing through said transparent areas of said scanning window means in said rotating reticle; a first means for registering the electric current pulse output of said detector means which is representative of the elevation angle of the target with respect to the boresight; a second means for registering the electric current pulse output of said detector means; electric gate circuit control means for cutting off the reception of a portion of the electric current pulse output of said detector means by said second registering means, the portion of the electric current pulse output of said detector means received by said second registering means being representative of the azimuth angle of the target with respect to the boresight; means for operating said gate circuit control means, said means for operating said gate circuit control means being associated with the azimuth angle of the target with respect to the boresight; means for resetting said first and second registering means for a subsequent cycle of operation, and said resetting means being operated in response to the completion of each cycle of activation of said detector means by light from the target passing through said transparent areas of said scanning window means in said rotating reticle to reset said first and second registering means, thereby providing a continuously corrected readout of elevation and azimuth angles of the target with respect to the boresighted direction of the theodolite.

4. A theodolite having a boresight for measuring elevation and azimuth angles of a target with respect to the boresight, said theodolite comprising: a convergent optical system for converging light rays received from the target; a rotatable reticle having partly transparent scanning window means, said scanning window means comprising spaced opaque areas disposed radially outwardly from the axis of rotation of said reticle and radially extending transparent areas alternating with said opaque areas, at least some of the radially extending transparent areas being of successively decreasing radial length in the direction of rotation of said reticle, said optical system being so disposed and arranged as to converge light rays from the target onto one surface of said reticle; a first light-sensitive detector means having electric current pulse output when activated by light, said first detector means being disposed on the opposite side of said rotatable reticle from said optical system, said scanning window means on said reticle being so disposed and arranged as to pass between said optical system and said first light-sensitive detector means when said reticle is rotating, said first light-sensitive detector means being so disposed and arranged as to intercept light rays converged by said optical system and passing through said transparent areas of said scanning window means in said rotating reticle, said reticle having a second transparent area means, said second transparent area means being so disposed and arranged as to reach the same degree of rotation at a later time than a corresponding transparent area of said scanning window means; said second transparent area means having a trailing edge providing a pattern of light transmission distinctive from that provided by the rest of said second transparent area means, said scanning window means and said second transparent area means being disposed in fixed relationship to one another; a steady light source disposed on the side of said reticle facing said optical system, said steady light source being so disposed and arranged as to direct light through said second transparent area means on said reticle at a time later than the start of light transmission through a transparent area of said scanning window means; a second light-sensitive detector means having electric current pulse output when activated by light, said second detector means being disposed on the side of said rotatable reticle opposite from said steady light source and being so disposed and arranged as to intercept light from said steady light source passing through said second transparent area means; a first means for registering the electric current pulse output of said first light-sensitive detector means; a second means for registering the electric current pulse output of said first light-sensitive detector means; electric gate circuit control means being disposed electrically in series between the output side of said first light-sensitive detector means and said second registering means for transmitting the electric current pulse output from said first light-sensitive detector means to said second registering means and being electrically controlled by being connected to said second light-sensitive detector means so as to cut off the reception of a portion of the electric current pulse output from said first light-sensitive detector means by said second registering means dependent upon an electric current pulse output being emitted from said second light-sensitive detector means; a reset device connected electrically to the output side of said second light-sensitive detector means and also connected electrically to each of said first and second registering means, said reset device permitting passage of an actuating pulse from said second light-sensitive detector means which is generated therein by said trailing edge of said second transparent area means of said reticle, said actuating pulse through said device acting to reset said first and second registering means for a subsequent cycle of operation, whereby light rays emitted from the target are directed by said optical system through said transparent areas of said scanning window means of said rotating reticle to activate said first light-sensitive detector means thereby providing an electric current pulse output, the electric current pulse output from said first light-sensitive detector means registered by said first registering means representing the elevation angle of the target, and the portion of the electric current pulse output of said first light-sensitive detector means received by said second registering means representing the azimuth angle of the target, and said first and second registering means after completion of each cycle of operation being reset by said actuating pulse from said second light-sensitive detector means through said reset device, thereby providing a continuously corrected readout of elevation and azimuth angles of a target with respect to the boresighted direction the theodolite.

5. A theodolite for presenting output data defining the elevation angle and the azimuth angle of an object relative to a sighting axis substantially instantaneously in digitalized electric current pulse form, said theodolite comprising: an optical system including image focusing means having an optical axis for focusing a field of view in which the object lies on a selected plane surface, rotatable disc reticle means having a surface coplanar with the plane surface on which the field of view is focused by said image focusing means, said reticle means being rotatable about an axis parallel to and displaced a selected distance from the optical axis of said image focusing means such that the field of view focused by said image focusing means will impinge on said surface of said rotating reticle means in a circular band area disposed radially outwardly from the axis of rotation of said reticle means, said reticle means having substantially equally spaced patterns of radially extending slots provided therein and disposed within the circular band area swept out by the field of view focused on said surface of said rotating reticle means, some of said slots in each of said patterns of slots in said reticle means successively decreasing in radial length such that the slots of shortest radial length in the respective patterns thereof in the reticle means are disposed in trailing position with respect to the direction of rotation of said reticle means, with said reticle means having reference apertures provided therein at a different radial distance from its axis of rotation than said patterns of slots and respectively corresponding to each of said patterns of slots, a light source disposed on one side of said reticle means for directing a beam of light toward said reticle means at the same distance from its axis of rotation as said reference apertures, first light detection means on the opposite side of said reticle means from said image focusing means and disposed in spaced relation to said patterns of slots in said reticle means for detecting light passing through a respective pattern of slots, said first light detection means having electric current pulse output when activated by light, a first means for registering the electric current pulse output of said first light detection means as digitalized pulse information, second light detection means on the opposite side of said reticle means from said light source and disposed in spaced relation to said apertures in said reticle means for detecting light passing through a respective aperture, said second light detection means having electric current pulse output when activated by light, a second means connected to said first light detection means for registering electric current pulse output from said first light detection means as digitalized pulse information, gate circuit control means connected to said second light detection means and electrically interposed between said first light detection means and said second registering means for cutting off the reception of a portion of the electric current pulse output of said first light detection means by said second registering means in response to an electric current pulse output from said second light detection means due to light from said light source passing through one of said apertures in said reticle means, whereby the total number of slots per pattern through which light is detected by said first light detection means is a measure of the elevation angle of the object in the field of view and the number of slots per pattern through which light is detected by said first light detection means before said gate circuit control means is actuated to cut off the reception of a portion of the electric current pulse output of said first light detection means by said second registering means is a measure of the azimuth angle of the object, and resetting means respectively actuated by the trailing edge of each of said apertures to reset said first and second registering means before a succeeding pattern of slots in said reticle means is moved across the field of view focused on said surface of said reticle means.

6. A theodolite according to claim 5, wherein the portions of said reticle means between respective patterns of slots are substantially semi-transparent so as to modulate sudden changes in the level of light of the field of view focused by said image focusing means on said surface of said reticle means.

7. A theodolite for measuring the elevation angle of an object relative to a sighting axis, said theodolite comprising: a rotatable reticle means having an axis of rotation substantially parallel to the sighting axis, a light-sensitive detector disposed on one side of said reticle means in alignment therewith and responsive to light passing through said reticle means for emitting an output signal, an optical system disposed on the opposite side of said reticle means in alignment with said reticle means and said detector for directing light rays from the object to said reticle means so that light passes through said reticle means to said detector, a resettable accumulator operably associated with said detector and responsive to the output signal emitted from said detector, said detector having indicating means giving an indication of the number of pulses which it receives from said detector after being reset, said reticle means having a plurality of window means disposed radially outwardly from the axis of rotation of said reticle means in circumferentially spaced relationship, each of said window means comprising a plurality of radially extending light-transmitting areas alternating with opaque areas, and the inner ends of at least some of the radially extending light-transmitting areas in each of said window means being at gradually increasing distances from the axis of rotation of said reticle means, whereby the number of light-transmitting areas in each of said window means which are penetrated by light rays directed against said rotating reticle means by said optical system is dependent upon the radial distance of the light rays from the axis of rotation of said reticle means which in turn is dependent upon the elevation angle of the object being viewed relative to the sighting axis of the optical system, and each penetration of a light-transmitting area by light rays directed against said rotating reticle means by said optical system producing a pulse in said detector as an output signal emitted therefrom such that the frequency of the pulses generated by said detector is a function of the elevation angle of the object being viewed relative to the sighting axis, a second accumulator operably associated with said detector for receiving the output signal emitted therefrom, a gate circuit interposed between the output side of said detector and said second accumulator, said gate circuit having transmission control means to render it in a transmitting or in a non-transmitting condition, said reticle means being provided with a second window means, a light source on one side of said reticle means for impinging light on said second window means at intermittent intervals when said reticle means is rotating, a second light-sensitive detector disposed on the opposite side of said reticle means from said light source and in alignment therewith for emitting an output signal in response to light passing through said second window means in said reticle means, and means connecting the output side of said second detector to said transmission control means to render said gate circuit in a non-transmitting condition when light passes through said second window means, whereby the reception of the output signal pulses of said detector by said second accumulator is discontinued when light passes through said second window means and the number of pulses received by said second accumulator from said detector prior to the discontinuance of the reception thereof is an indication of the azimuth angle of the object being viewed relative to the sighting axis.

8. A theodolite according to claim 7, wherein said second window means comprises a plurality of circumferentially spaced apertures in said reticle means corresponding in number to said plurality of first-mentioned window means, said apertures being disposed radially outwardly from the axis of rotation of said reticle means at a different radial distance from its axis than said plurality of first-mentioned window means, and the leading edge of each of said apertures being offset from the leading edge of the plurality of light-transmitting areas of a respective one of said first-mentioned window means corresponding thereto to lag therebehind in the direction of rotation of said reticle means, and said light source being imaged on substantially the same radius of said reticle means as the object being viewed by said optical system.

9. A theodolite for presenting output data defining the elevation angle and the azimuth angle of an object relative to a sighting axis substantially instantaneously, said theodolite comprising: an optical system including image focusing means having an optical axis for focusing a field of view in which the object lies on a selected plane surface, rotatable disc reticle means having a surface coplanar with the plane surface on which the field of view is focused by said image focusing means, said reticle means being rotatable about an axis parallel to and displaced a selected distance from the optical axis of said image focusing means such that the field of view focused by said image focusing means will impinge on said surface of said rotating reticle means in a circular band area disposed radially outwardly from the axis of rotation of said reticle means, groups of transparent areas in said reticle means disposed within the circular band area swept out by the field of view focused on said surface of said rotating reticle means, said transparent areas having varying dimensions such that light from differing positions in the field of view will pass through a different number of said transparent areas, and the portions of said reticle means between respective groups of transparent areas are substantially semi-transparent so as to modulate sudden changes in the level of light of the field of view focused by said image focusing means on said surface of said reticle means, whereby the angular relation of the object relative to a sighting axis may be determined by the number of said transparent areas through which light emitted from the object in the field of view passes.

References Cited by the Examiner

UNITED STATES PATENTS

| | | | |
|---|---|---|---|
| 2,403,983 | 7/1946 | Koenig | 250—233 X |
| 2,582,728 | 1/1952 | Walker | 88—1 |
| 2,734,269 | 2/1956 | Claret | 88—1 |
| 2,791,695 | 5/1957 | Bareford et al. | 88—14 |
| 2,800,831 | 7/1957 | Kieser et al. | 88—1 |
| 2,961,545 | 11/1960 | Astheimer et al. | 88—1 |
| 2,997,699 | 8/1961 | Lovell | 88—61 |
| 3,006,236 | 10/1961 | Michaud | 88—2.4 |
| 3,007,053 | 10/1961 | Merlen | 250—233 |
| 3,034,405 | 5/1962 | Biberman et al. | 88—1 |

JEWELL H. PEDERSEN, *Primary Examiner.*

EMIL G. ANDERSON, *Examiner.*